June 5, 1956  B. KAUL  2,748,464
METHOD OF COLD FORMING STEEL PRESSURE CYLINDERS
Filed Sept. 1, 1949  5 Sheets-Sheet 1

INVENTOR.
Ben Kaul
BY
ATTORNEYS

June 5, 1956  B. KAUL  2,748,464
METHOD OF COLD FORMING STEEL PRESSURE CYLINDERS
Filed Sept. 1, 1949  5 Sheets-Sheet 2
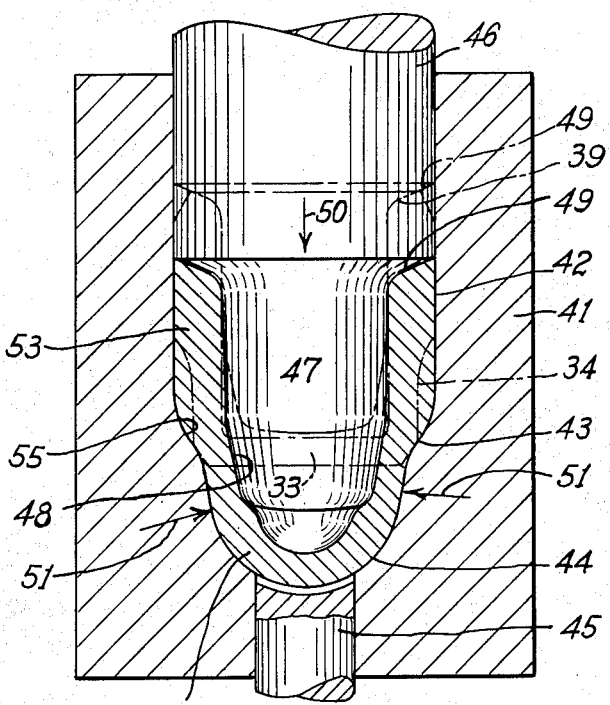
Fig. 4
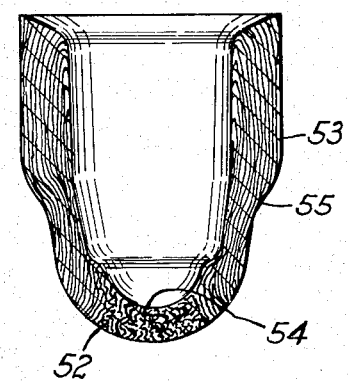
Fig. 13
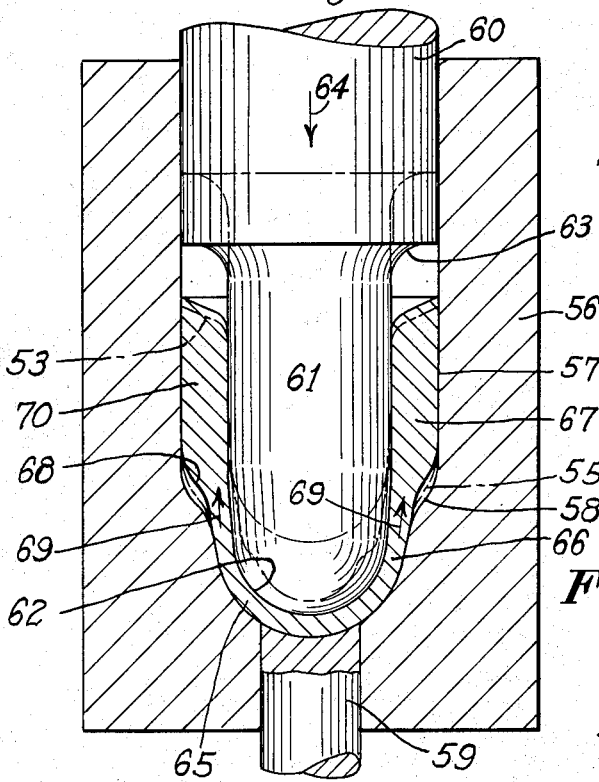
Fig. 5
Fig. 14
INVENTOR.
Ben Kaul
BY
*Frease and Bishop*
ATTORNEYS

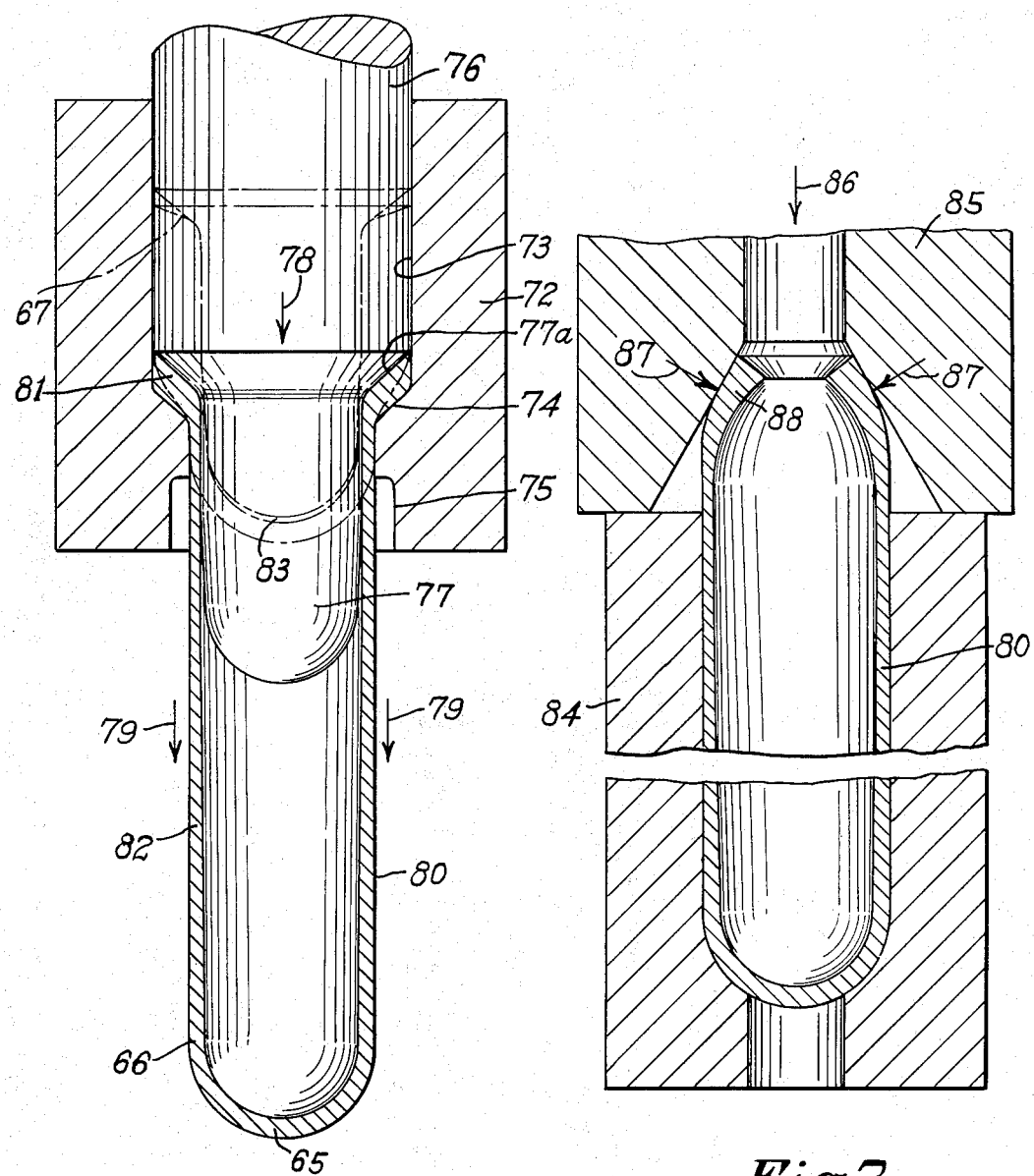

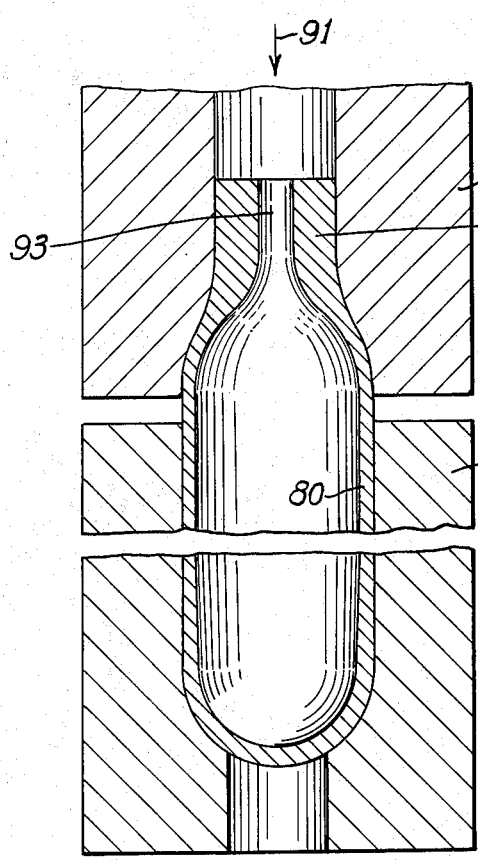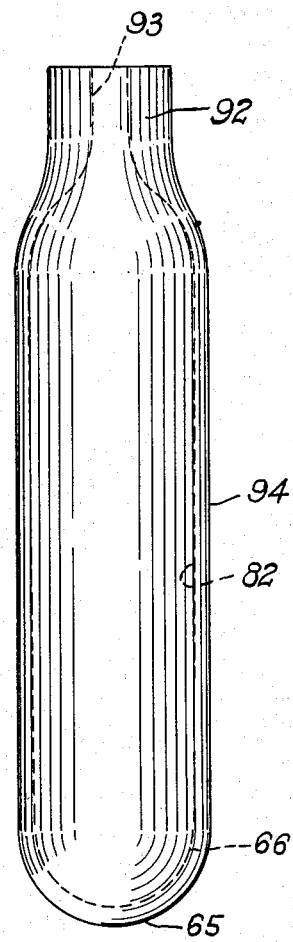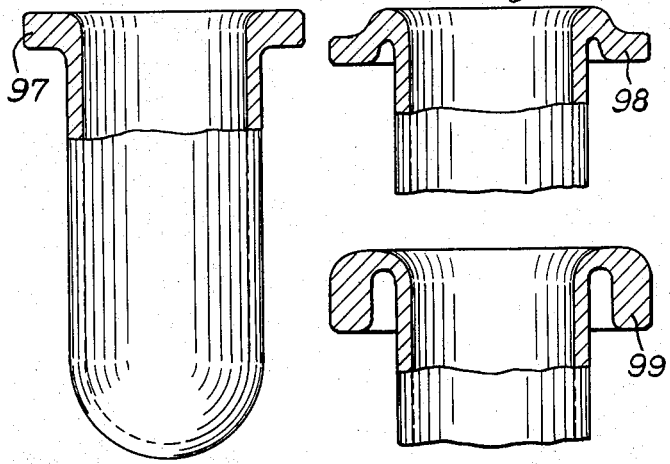

June 5, 1956   B. KAUL   2,748,464
METHOD OF COLD FORMING STEEL PRESSURE CYLINDERS
Filed Sept. 1, 1949   5 Sheets-Sheet 5

INVENTOR.
Ben Kaul
BY
Frease and Bishop
ATTORNEYS

United States Patent Office 2,748,464
Patented June 5, 1956

2,748,464

METHOD OF COLD FORMING STEEL PRESSURE CYLINDERS

Ben Kaul, Warren, Ohio, assignor, by mesne assignments, to American Radiator & Standard Sanitary Corporation, New York, N. Y., a corporation of Delaware Application September 1, 1949, Serial No. 113,536

10 Claims. (Cl. 29—535)

The invention relates generally to method of cold forming steel pressure cylinders or containers. More particularly, the invention relates to a method of cold working a single solid steel blank to form a steel pressure container having tubular side walls and an integral, sound, leakproof and strong closed bottom wall; or to form a container in which the closed bottom wall thereof has either a convex, flat or concave shape either or both inside or outside.

Tubular containers or pressure cylinders having tubular side walls, an integral or closed bottom wall and a necked-in top end with an opening therethrough are used for many purposes and have been made of steel or other metals. Such containers, cylinders, or cartridges may be used for confining fluids or other materials or elements under pressure. These materials may be gases, liquids, acids, powders and the like, used in fire extinguishers, and gases used in cartridges for inflation or carbonation purposes. The containers also may constitute tanks for the storage and use of various kinds of gases under pressure such as oxygen, hydrogen, nitrogen, helium, carbon dioxide, natural and artificial gas, and the like. The containers also may constitute ammunition shells and the like. Similarly, containers having integral convex or concave bottom walls are used for many purposes.

Several prior art procedures have been used for the manufacture of tubular containers from steel, depending upon the size or shape, or ultimate characteristics or use of the finished article.

First, plate metal pieces, or tubular and plate metal pieces have been formed to the required or desired shape and assembled together by welding to form the finished container, as in the manufacture of commercial oxygen-containing cylinders. This procedure involves expensive welding and related operations, and requires relatively heavy walls to provide the necessary strength.

Second, a closed-end tubular-walled article has been formed by hot forging and upsetting operations, followed by various machining operations, inside and outside, to provide the finished size and shape, as in the manufacture of high-explosive shells or projectiles. In this procedure, other expensive operations of cleaning, heat treating, shot blasting, etc. are required.

Third, a thin-walled tube, having a heavy bottom wall substantially the same thickness as the disk-like plate blank from which the tube is made, has been formed by repeated drawing operations, as in the manufacture of projectile cartridge cases. A variation in this method has been to form a heavy-walled cylinder with a heavy base or bottom wall from bar stock by hot forging or upsetting operations and then to complete the manufacture of the cartridge case by deep drawing operations. These procedures involve many expensive annealing, pickling and related operations.

Fourth, fire extinguisher pressure cylinders and the like have been made by hot forming and hot rolling operations, also involving heat treating to develop the desired characteristics in the finished product.

Fifth, the Germans prior to, and during, the last World War, utilized one or more steps of cold extrusion, sometimes followed by one or more cold drawing operations to form cartridge cases, grenades, and the like. The final article made in this manner had either a relatively heavy bottom wall usually worked or shaped and then heat treated as a final operation when made from bar stock; or had a bottom wall substantially the same thickness as that of the initial blank when made from a disc of plate metal. These procedures likewise involved several annealing and pickling operations.

In most all of the foregoing prior art procedures, special types of steel or alloy steel are required; and in all of such prior procedures there is a substantial scrap loss in producing the finished article.

Moreover, none of these prior procedures provide for the manufacture of the finished steel article from a starting blank or slug without any scrap loss; or for the manufacture of a thin-walled cylinder having an integral bottom wall approximating in thickness the thickness of the cylinder walls and having a dense, sound, strong, leakproof and pressure-resisting bottom wall metal structure developed by cold working and without subsequent heat treatment of the article; or for the manufacture of a cylinder having an integral, convex, flat or concave bottom wall or base, in which the desired degree of strength or hardness is developed in the cylinder walls including the bottom wall without heat treatment solely by cold working; or for the manufacture of a steel pressure cylinder having any desired degree of strength or hardness from ordinary steel ranging from ingot iron to, say, .40 carbon steel.

There is an existing and unsatisfied need in the art for substantially reducing the cost of making steel pressure cylinders or containers and for substantially reducing the amount of raw material required for the manufacture of a pressure cylinder or container of any particular size, shape or strength. One of the major difficulties preventing a solution of this problem has been the prior inability to form a sound, strong, relatively thin, leakproof and high-presure-resisting bottom wall in a one-piece steel pressure cylinder by cold working operations from bar stock. Another difficulty has been the prior inability to form a sound, convex, flat or concave thin-walled bottom on a closed-end cylinder by cold working operations from bar stock.

These difficulties apparently have arisen because all prior known cold working operations or procedures used to form a closed-end, steel, tubular article involving any substantial cold working of the bottom wall have destroyed, opened up, or so altered the grain structure or grain flow lines in the bottom wall of the finished article as to weaken the same or have not altered the grain structure uniformly to provide the desired characteristics. In other words, when the bottom wall has been cold worked the resulting bottom wall structure has not been sound, leakproof or pressure resistant. Thus, it has been necessary to avoid cold working the metal in the bottom wall when cold forming from bar stock. A disk-like blank of sheet or plate metal had to be used to provide a bottom wall substantially compared to one formed from bar stock. Cold working of the bottom wall of an article made from a disk-like blank develops the desired hardness but destroys the grain structure in the opposite direction of its original rolling direction and is not leakproof or pressure resistant unless made substantially thicker than the remaining portion of the article.

I have discovered certain critical factors which, if coordinated, enable the enumerated prior art difficulties to be avoided and the problem solved. This discovery involves a procedure or series of steps in the cold working of a metal blank to produce in the finished steel article what is termed herein "crossing the grain at the bottom." In the discovered procedure the cold working deforms and seals the grain structure at the bottom of a cold-worked, closed-bottom, tubular steel article so that the article, and particularly the bottom wall thereof, can withstand high pressures and is leakproof; and so that the bottom wall can be shaped to have a convex, flat or concave form, relatively thin, approximating the thickness of the thin side walls of the finished article.

Fundamentally, the grain crossing procedure involves, first, cold forming by axial compression to cup shape a steel slug of substantial height having grain flow lines running generally in an axial direction, and providing a substantially flat thin-walled bottom in the formed cup; then squeezing or compressing the flat bottom wall of the cup circumferentially inward by pressure effectively acting at an angle to the vertical axis of the bottom wall; and then applying axial compression to the circumferentially inwardly-squeezed bottom wall to cross and seal the grain in the bottom wall and to form the desired outside and inside bottom wall configuration or shape.

Accordingly, it is a general object of the present invention to provide a new cold-worked, closed-bottom, tubular steel product.

Moreover, it is an object of the present invention to provide a new steel pressure cylinder product having an integral, cold-worked, dense, sound, strong, leakproof and pressure-resisting bottom wall which may be as thin as the cylinder side walls.

Also, it is an object of the present invention to provide a new cold-formed, tubular, closed-bottom, steel container having either a convex, flat or concave shape, either or both, on the inside or outside of the bottom wall, and having bottom wall strength or hardness approximating or greater than that present in the side walls.

Furthermore, it is an object of the present invention to provide a new, closed-bottom, tubular article formed of steel ranging from ingot iron to, say, .40 carbon steel, and having cold worked surfaces and a predetermined strength and hardness developed in its side and bottom walls by cold working.

Moreover, it is an object of the present invention to provide a new, cold-worked, closed-bottom tubular steel article having a crossed or sealed grain structure in the bottom wall thereof.

Also, it is an object of the present invention to provide a new method of making a steel pressure cylinder or container.

Likewise, it is an object of the present invention to provide a new procedure for cold working a metal blank to closed-bottom tubular shape to form a sound, strong, leakproof, dense, pressure-resisting bottom wall metal structure therein.

Also, it is an object of the present invention to provide a new method or procedure of cold working a metal blank to form a closed-end tubular article having a relatively thin, convex, flat or concave bottom wall shape either or both on the inside or outside thereof.

Likewise, it is an object of the present invention to provide a new cold-working procedure for crossing the grain at the bottom of a closed-end tubular steel article.

Furthermore, it is an object of the present invention to provide a new cold-working procedure for developing the desired degree of strength and hardness not only in the side walls but also in the bottom wall of a closed-end tubular steel article without heat treatment solely by cold working.

Also, it is an object of the present invention to provide a new method of making a closed-end tubular article from a starting blank or slug without any scrap loss.

Moreover, it is an object of the present invention to provide a new method of making a closed-end tubular article from ordinary steel ranging from ingot iron to, say, .40 carbon steel, and in which the desired degree of strength or hardness is developed in the article walls by cold working.

Also, it is an object of the present invention to substantially reduce the cost of making a closed-end tubular steel article from the standpoints of the amount of raw material required and number of operations involved.

Finally, it is an object of the present invention to solve the existing problems in the art, to eliminate the prior art difficulties in the manufacture of closed-end tubular steel pressure containers and articles, to generally improve cold working procedures and products, and to obtain the foregoing advantages and desiderata in a simple and effective manner.

These and other objects and advantages apparent to those skilled in the art from the following description and claims, may be obtained, the stated results achieved, and the described difficulties overcome by the products, methods, steps, operations and procedures which comprise the present invention, the nature of which are set forth in the following general statements, a preferred embodiment of which—illustrative of the best mode in which applicant has contemplated applying the principles—is set forth in the following description and shown in the drawings, and which are particularly and distinctly pointed out and set forth in the appended claims forming part hereof.

The nature of the improvements in cold formed steel pressure cylinders, cartridges, containers and the like may be stated in general terms as comprising a cold-worked, closed-end tubular steel article formed from ordinary steel ranging from ingot iron to, say, .40 carbon steel, having a sound, strong, leakproof, dense, pressure-resisting, bottom wall metal structure, having a convex, flat or concave bottom wall shape or configuration, having relatively thin side walls and a relatively thin bottom wall which may approximate the thickness of the thin side walls, and having a crossed or sealed grain structure in the bottom wall.

The nature of the discoveries and improvements in methods of making a closed-bottom steel pressure cylinder or container may be stated in general terms as preferably including the steps of cold forming a steel slug of substantial height having grain flow lines running generally in an axial direction to cup shape by axial compression, providing a substantially flat thin-walled bottom in the formed cup, deforming the grain flow lines in the cup bottom wall by such axial compression to irregular or random arrangement; cold squeezing or compressing the flat bottom wall of the cup circumferentially inward by pressure acting effectively at an angle to the verticle axis of the bottom wall to radially inwardly displace and compress the deformed grain flow lines in the bottom wall; and then applying axial compression to the inwardly squeezed bottom wall to form the desired bottom wall configuration and axially to compress the radially compressed deformed grain flow lines and cross and seal said grain structure in the bottom wall.

By way of example, the improved method and product of the present invention are shown somewhat diagrammatically in the accompanying drawings forming part hereof, wherein:

Fig. 4 is a view similar to Figs. 2 and 3 showing the next step in the improved method;

Fig. 5 is a view similar to Figs. 2, 3 and 4 illustrating the final step for crossing the grain at the bottom in accordance with the invention;

Fig. 6 is a view similar to Figs. 2 through 5 illustrating the step of extruding the article formed in Fig. 5 to an elongated tubular shape;

Fig. 7 is a view illustrating the first stage of nosing in the open end of the article formed in Fig. 6;

Fig. 8 is a view similar to Fig. 7 showing the final step of nosing in the open end and thickening the open end wall of the article illustrated in Fig. 7;

Fig. 9 is a side view of an improved steel pressure cylinder of the present invention made in accordance with the method shown in Figs. 2 through 8;

Fig. 13 is a view similar to Figs. 10, 11 and 12 showing the grain flow lines in the piece resulting from the operation shown in Fig. 4;

Fig. 14 is a view generally similar to Figs. 10 through 13 showing the grain flow lines in the piece formed by the operation disclosed in Fig. 5; and Figs. 15 through 21 are views similar to Fig. 9 of other articles which may be formed by the improved method.

Similar numerals refer to similar parts throughout the various figures of the drawings.

Figure 2:
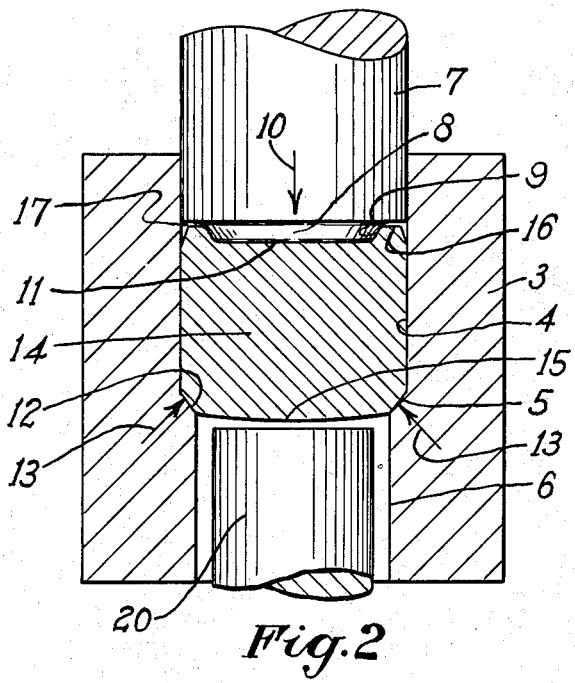
Fig. 2 is a somewhat diagrammatic sectional view illustrating the first step in the improved method.

In the drawings, the improved method illustrates the manufacture of a pressure cylinder which may be used in fire extinguishers or as a gas-containing cartridge for any other use. However, the invention is not limited to the manufacture of a cylinder used for such purposes as the same steps may be used to form a high-explosive shell or other closed-bottom tubular article.

Figure 1:
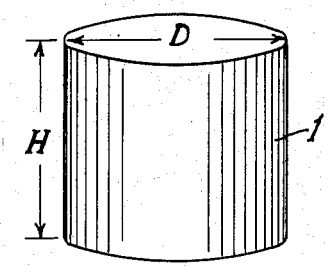
Figure 1 is a perspective view of a metal blank cut from a piece of bar steel used as the starting blank for the manufacture of the improved closed-bottom tubular steel article.

A cylindrical piece of steel preferably cut from a steel bar as rolled and as received from the steel mill is indicated at 1 in Fig. 1 and comprises the solid starting blank for the method to be described. The metal used in accordance with the present invention does not have to have a special or premium analysis or to be an alloy steel, but ordinary carbon steel may be used ranging from ingot iron to, say, .40 carbon steel. A particular carbon content within such range may be selected for the manufacture of some particular article depending on the size and shape of the article, the extent of cold working performed on the piece, and the final hardness or strength to be developed therein. However, it is an important feature of the present invention that a special analysis of steel and the use of a special heat treating procedure is not required in order to develop in the final article, the desired strength and hardness, as these characteristics or properties are developed in the final article solely by cold working. Thus the cheapest grade of steel may be used as a raw material for products made in accordance with the present invention.

Furthermore, the amount of steel present in the blank 1 is determined by the amount of steel to be present in the finished cold formed article as there is no scrap loss in carrying out the improved method.

The solid blank 1 is illustrated as being cylindrical and is described as being cut from a round bar. However, the blank 1 may have some other shape in cross section if the outer cross-sectional shape of the finished article is to be other than circular, such as oval, hexagonal and the like; or the blank 1 may have other than the circular cross-sectional shape even to form a final article round in outer cross section, since the blank is prepared in the step illustrated in Fig. 2 for subsequent cold working operations.

The blank used in accordance with the present invention must have sufficient height H in the direction of its axis, either in its initial or prepared state, to permit the grain in the bottom wall of the completed article to be closed. It cannot be a disk-like blank punched from sheet or plate metal. Likewise, the metal loss in cutting a large diameter thin disk from bar stock is such as to make it impractical to use such a disk. The height H of the blank will always be substantially greater than the final bottom wall thickness of the finished product. Normally the diameter D of the blank 1 may approximate or be larger than the diameter of the article finally formed. However, a smaller diameter blank 1 may in some cases be used because the operation or operations of preparing the blank for further cold forming steps may be used to increase the diameter thereof in certain regions. However, the diameter of the blank as finally prepared should be equal to, or larger than, the largest outer diameter of the final article to be manufactured.

Figure 10:
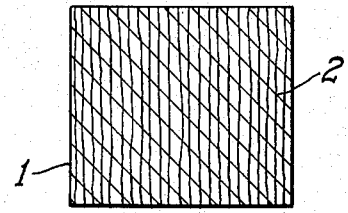
Fig. 10 is a diagrammatic sectional view of the blank illustrated in Fig. 1 showing the grain flow lines in the starting blank.

The grain flow lines originating in the bar steel from which the blank 1 was cut are illustrated diagrammatically at 2 in Fig. 10 as running generally parallel to the vertical axis of the blank. The blank 1 in accordance with the present invention is placed in a blank preparation die 3 (Fig. 2) having a recessed cavity 4 therein circular in cross section, with a shoulder 5 at the bottom thereof and a reduced portion 6. The walls of the cavity 4 are preferably slightly tapered for draft and may be slightly larger in diameter at the top than the diameter D of the blank 1 and slightly smaller at the bottom to insure a perfectly round prepared blank.

A punch 7 is associated with die 3 having a shallow nose 8 preferably substantially flat on its bottom and having rounded circumferential corners and a somewhat tapered outer wall 9 of less diameter than the diameter of the cavity 4. The blank 1 when placed in die cavity 4 has its vertical axis running in the direction of movement of the punch 7 and the grain flow lines 2 thereof extend in the same direction.

Downward movement of the punch 7 within the die cavity 4 applies a compressive force indicated by the arrow 10 to the blank 1 so that when the punch 7 has reached the end of its downward travel, a center impression 11 is formed in the top surface of the blank by the shallow nose 8; and an angular reduction 12 is formed on the bottom corner of the blank by the effective force or resistance of the shoulder 5, indicated by the arrows 13, resulting from the downward pressure 10 on the blank exerted by the punch 7, thus forming the prepared blank indicated generally by the numeral 14.

Thus, in carrying out the blank-preparing operation illustrated in Fig. 2, compressive forces 10 and 13 operating at angles to each other are exerted on the blank 1 as a result of the downward pressure of the punch 7. The particular angle of the forces 13 is not critical so long as an angular reduction is made at the bottom corner of the blank generally inward circumferentially of the blank.

The cold working of the blank 1 to form the prepared blank 14 also accurately sizes the prepared blank 14, compresses the metal therein, and slightly expands by compression the outer periphery of the blank to fill the cavity 4, thus forming the blank to be truly round at all sections, if a round piece is desired, and overcoming any irregularities in the roundness of the blank 1 which may have been present in the bar stock produced in the steel mill. The blank-preparing operation also slightly bulges the bottom surface of the blank 14 to have a slight convex shape indicated at 15.

It is important that the punch 7 shall not bottom on the outer circumferential end 16 of the prepared blank 14 surrounding the center impression 11, as indicated by the slight clearance illustrated at 17 in Fig. 2. Thus, the metal of the prepared blank 14 is not cold worked to any substantial extent excepting in the zones immediately below the center impression 11 and adjacent the angularly reduced bottom corner 12.

Figure 11:
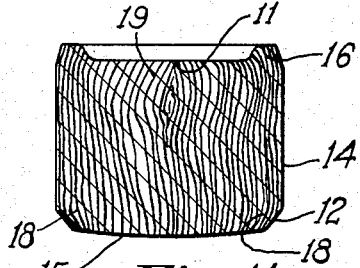
Fig. 11 is a view similar to Fig. 10 but showing the rearrangement of the grain flow lines as a result of the operation shown in Fig. 2.

The effect of the blank preparation operation upon the grain flow lines indicated at 2 in Fig. 10 is illustrated diagrammatically in Fig. 11. These lines are deformed inward as indicated at 18 adjacent the angular reduction at the bottom corner of the blank, and are deformed in a wavy manner below the center impression 11 as indicated at 19, thus starting the crossing of the grain.

Care must be exercised in carrying out the blank-preparing operation that the grain flow lines are not sheared in a longitudinal direction. In other words, it is desirable to prevent slippage longitudinally between adjacent grain flow lines, the occurrence of which may result in internal segregation or cracks, if a leakproof, pressure resistant bottom wall is to be formed. The formation of the slightly bulged or convex bottom surface 15 in the prepared blank 14 is an indication that no shearing of the grain flow lines has occurred.

In the zones 18 and 19 where the grain flow lines have been substantially deformed, the metal in the blank 14 has been work hardened, but no substantial work hardening has occurred in other zones of the blank.

Figure 3:
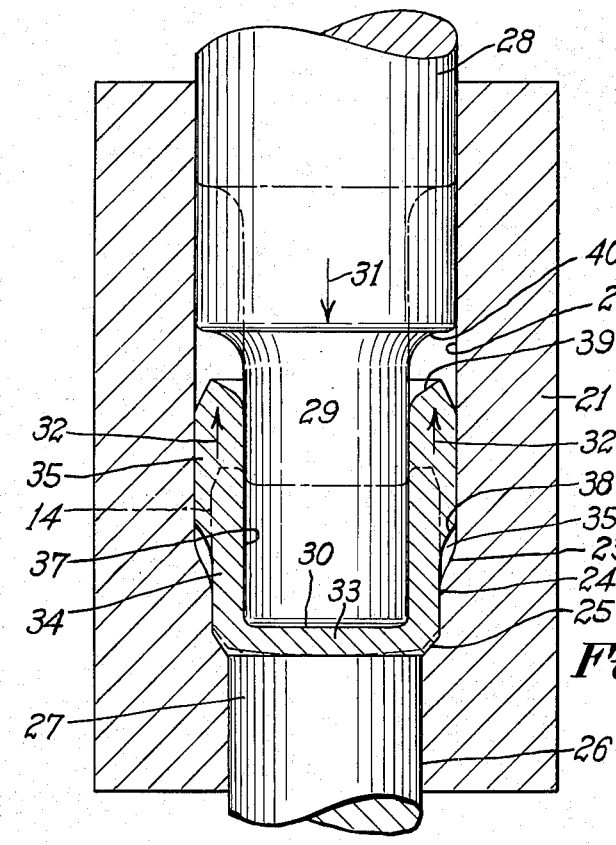
Fig. 3 is a view similar to Fig. 2 showing the next step in the improved method.

Upon withdrawal of the punch 7 from the die cavity 4 the prepared blank 14 may be ejected from the die 3 by the knockout member 20 after which the blank is subjected to the next cold forming operation illustrated in Fig. 3 in which the die 21 has a die cavity 22 provided with a first reduced angular shoulder 23, a reduced cavity portion 24, an angular shoulder 25 and a reduced portion 26. The bottom wall of the die cavity 22 is formed by support member 27 which also serves as a knock-out member. A punch 28 is associated with die 21 having an elongated nose member 29 provided with a flat bottom 30 with a radius at the outer corner of the flat bottom.

In Fig. 3, the prepared blank 14 is indicated in dot-dash lines as located in the die 21 when inserted therein preparatory to being subjected to the next cold-forming operation; and similarly the location of the punch 28 at the beginning of the forming operation is illustrated by dot-dash lines.

Downward movement of the punch 28 within the die cavity 22 applies a compressive force indicated by the arrow 31 from the bottom of the punch nose 29 to the center impression 11 in the blank 14, and the punch moves downward to the end of its travel illustrated in full lines in Fig. 3. The size and shape of the die cavity portion 24 and shoulder 25 is substantially the same as the size and shape of the die cavity 4 and shoulder 5 illustrated in Fig. 2. Thus, because the support member 27 closes off the bottom of the die cavity, as punch 28 moves downward the metal in the lower end of the blank is confined and cold worked and extrudes upward around the punch nose 29 as indicated by the arrows 32. During the downward stroke of punch 28 until its flat bottom wall 30 is opposite the die shoulder 23, the blank metal also extrudes outward and fills the lower end of the die cavity 22 above shoulder 23. During further punch movement downward, the metal continues to extrude upward, and the shoulder 38 formed on the resulting blank 34 moves upward away from the die shoulder 23, indicated by the clearance space 35a in Fig. 3.

This extrusion of the metal results from the compressive force exerted by the punch and completes the formation of the flat bottom wall 33 of the cup blank indicated generally at 34. The cup-forming operation does not substantially cold work or harden the metal in the zone 18 previously cold worked and hardened by the previous operation which angularly reduced the bottom corner 12 of the prepared blank 14. However, the bottom surface of the bottom wall 33 is flattened as illustrated.

Figure 12:
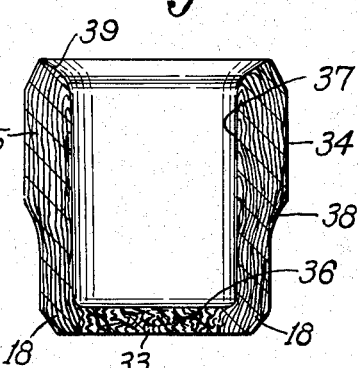
Fig. 12 is a view similar to Figs. 10 and 11 but illustrating the grain flow lines resulting from the operation shown in Fig. 3.

At the same time that the metal is extruded upward to form the thickened side wall portion 35 of the cup 34, the initially deformed and cold-worked metal in the zone 19 of the prepared blank 14 is pushed downward ahead of the punch nose end 30 and the grain flow lines are further severely deformed as illustrated diagrammatically at 36 in Fig. 12.

This operation constitutes a further stage in crossing the grain at the bottom of the finished article to obtain a sound base, free from defects, leakproof and pressure-resistant. The importance of this step is to complete the formation of the cup with a hole 37 in the cup blank 34 extending clear to the bottom of the blank, the bottom wall having a generally flat shape as illustrated at 33. Of equal importance in this stage of the grain-crossing procedure is the carrying of the initially deformed grain flow line zone 19 clear to the bottom of the blank and further severely deforming the same by compression axially of the blank without radial or outward circumferential expansion of the blank in the region of the bottom wall 33. Such expansion or outward movement of the metal in the blank 14 while the cup blank 34 is being formed, is prevented by the reduced cavity portion 24 and angular shoulder 25 of die 21.

Thus, critical factors in the procedure for crossing the grain at the bottom are, confining the blank 14 within the die 21 in the region of the lower end thereof, applying downward pressure by the punch 28 flatwise in forming the hole 37, and carrying the deformed grain flow line zone 19 to the bottom of the blank. If the bottom end of the blank is not confined, separation of the grain flow lines may occur; and if, for instance, a pointed nose punch is used, its effect could be spread or separate the metal structure in the bottom wall 33 as the same is being formed.

As the wall 35 of the blank 34 is extruded, a shoulder 38 is formed and the upper end of the wall 35 necks somewhat inward as indicated at 39. The purpose of the formations 38 and 39 for succeeding operations will be later described. As illustrated in Fig. 3, the shoulder 40 of punch 28 does not contact the upper end wall 39 of the cup blank 34 when the punch 28 reaches the limit of its downward movement so that no downward compression is exerted on the side walls of the cup blank 34 during this operation.

The deformation of the grain flow lines indicated at 36 in Fig. 12 and shown by etched specimens discloses a completely irregular and random arrangement of the grain flow lines with fish-hook or hairpin-like arrangements, so that the lines appear as a twisted, tangled, fibrous mass.

All of the metal in the walls of the cup blank 34 has now been subjected to severe cold forming operations and is thereby work hardened to an extent dependent upon the carbon content of the steel. If the character of the operation and the carbon content of the steel are such that the metal has been worked to the limit of its workability, then the blank must be annealed at this time. Ordinarily at this stage if the carbon content is above, say, .10 carbon steel, an annealing operation is performed for stress relief. However, if the material is ingot iron up to, say, .10 carbon steel, the cup blank ordinarily is not sufficiently work hardened to require an anneal for stress relief. If the cup blank 34 is annealed, the anneal is followed by a usual pickling operation.

The cup blank 34 is then removed from die 21 by knockout 27 and is pickled and annealed if such operations are required. If any annealing operation for stress relief or otherwise is required during the manufacture of the final article it must be performed before any of the further operations described and, therefore, annealing if used is performed at this stage in the procedure.

The cup blank 34 is then placed in die 41 (Fig. 4) having a die cavity 42 therein terminating in a reduced shoulder 43, and a rounded cavity bottom 44. A knockout member 45 is provided to eject the article from die 41. A punch 46 is associated with die 41 having a nose member 47 provided with a tapered end 48 and a shoulder 49 at the upper end of the nose member 47.

The diameter of the die cavity 42 is substantially the same as the outside diameter of the thickened side wall portion 35 of cup blank 34; and the diameter of the cylindrical portion 47 of the punch nose member is substantially the same as the diameter of the hole 37 in the cup blank 34. When the cup blank 34 is placed in die 41, its initial position therein is indicated by the dot-dash lines in Fig. 4; the location of the punch 46 at the beginning of the forming operation also being indicated by dot-dash lines with the shoulder 49 engaged against the upper end 39 of the cup side wall and the bottom end of the punch member just clearing the bottom wall 33 of cup blank 34. As indicated in Fig. 4, the outer diameter of the lower end of the cup blank 34 is larger than the diameter of the curved bottom portion 44 of the die cavity 42 so that the bottom corner of the cup blank 34 rests on the reduced shoulder 43 of the die cavity 42 at the beginning of the operation.

Downward movement of the punch 46 within the die cavity 42 applies a compressive force indicated by the arrow 50 from the punch shoulder 49 to the top 39 of the side walls of the cup blank 34. As the punch moves downward, this compressive force pushes the lower portion of the side walls of the cup blank 34 downward within the reduced die cavity portion 44 laterally inwardly squeezing and compressing the bottom wall 33 of the cup blank 34 and the lower portion of the side walls thereof so that the parts assume the position shown in full lines in Fig. 4 when the punch has reached the limit of its downward movement.

The reducing, squeezing, compressing, and forming of the bottom wall of the cup blank 34 thus results from the effective force or resistance of the die shoulder 43 and reduced cavity portion 44, indicated by the arrows 51, the same being the resultant of the downward pressure 50 on the blank 34 exerted by the punch 46. This inward compression of the flat bottom base 33 of the cup blank 34 to form a smaller-diameter curved-bottom wall 52 in the resulting blank 53, by compression applied at the top of the blank 34 to push the flat bottom into a smaller curved die cavity thickens the bottom wall 52 somewhat and partially completes the crossing of the grain in the base area of the formed blank 53 which was started in previous steps.

Broadly speaking, the operation illustrated in Fig. 4 squeezes and compresses the bottom wall 33 of cup blank 34 in a sidewise direction or at an angle to the downward direction in which the bottom wall 33 was formed by the operation illustrated in Fig. 3. This sidewise squeezing of the metal in the bottom of the blank 53 also compresses and compacts the deformed grain flow lines 36 laterally inward to compress the matted, fibrous mass in the rounded bottom of blank 53 as indicated diagrammatically at 54.

It is important that there shall be no axial compression of the metal in the bottom 52 of blank 53 while the same is laterally squeezed and compressed inward and formed to curved shape.

In carrying out the operation illustrated in Fig. 4, little or no working of the metal in the blank 53 occurs in the side walls of the blank above the shoulder 55, so that if the blank was annealed, the unworked side wall portions remain soft and only the rounded bottom wall 52 becomes semi-hard. If the blank was not annealed, further hardening of the bottom wall 52 occurs while no further work hardening of the remainder of the blank 53 results.

The blank 53 is then placed in the bottom finishing die 56 (Fig. 5) having a die cavity 57 therein shaped to receive and fit the outer contour of the blank 53 except for clearance between the die cavity shoulder 58 and the shoulder 55 on blank 53. The bottom wall of the die cavity 57 is formed by support member 59 which also serves as a knock-out member. A punch 60 is associated with the die 56 having a nose member 61 provided with a rounded end 62 and a shoulder 63.

The location of the blank 53 when placed in die 56 is indicated by dot-dash lines in Fig. 5; and similarly the location of the punch 60 at the beginning of the forming operation is illustrated by dot-dash lines. Downward movement of the punch 60 within the die cavity 57 applies a compressive force indicated by the arrow 64 from the rounded end 62 of the punch nose 61 to the bottom wall 52 of the blank 53 in a generally axial direction thus compressing and coining the metal in the curved bottom wall 65 and forming the same to final shape and size. The limit of downward movement of the punch 60 and the final shape of the blank are shown in full lines in Fig. 5.

The metal in the lower portion 66 of the side walls of the resulting blank 67 below shoulder 68 is also worked and thinned somewhat as indicated to obtain the desired finished wall thickness and shape in this portion of the resulting blank 67. The additional metal in the bottom wall 52 of the blank 53 thus squeezed and compressed as the punch 60 moves downward, extrudes upward, as indicated by the arrows 69, around the periphery of the punch nose so that the upper thicker wall portion 70 originating in the blank 53 moves upward in the die cavity 57 to the position shown in full lines in Fig. 5. However, the shoulder 63 on punch 60 does not bottom on the upper end of the thickened side walls 70 so that no compression or working of the thickened side walls 70 occurs during this operation.

The axial compression of the bottom wall 65 of the resulting blank 67 in forming the bottom wall to final size and shape squeezes and compresses the deformed grain flow line area 54 at the bottom of the blank to complete the crossing of the grain as diagrammatically illustrated at 71 in Fig. 14 and effectively bends and compresses the grain flow lines on one another so as to close off and seal all impurities or inclusions in the steel and form a leakproof and pressure-resistant bottom wall.

The grain-crossing procedure in its various stages deforms the grain flow lines from an initial somewhat straight or parallel arrangement to wavy or zigzag or accordion-like lines, and the wavy or zigzag or accordion-like arrangement is finally endwise squeezed or compressed together, by the successive, axial compression to form the bottom wall 33 of blank 34, inward angular compression to start the formation of the round nose or bottom wall 52 of the blank 53, and the final axial compression to complete the formation of the round bottom wall 65 of blank 67.

In this operation the final cold working of the bottom wall 65 and side walls 66 of the resulting blank 67 up to the shoulder 68 therein is performed; and the final hardness or strength developed in the finished article in this region resulting from cold working is obtained. This final hardness or strength is uniform throughout the bottom wall area and may be any value desired up to the ultimate hardness or ultimate strength which may be developed in the particular steel being processed. The remaining portion of the blank in the upper thicker wall portion 70 is softer and subject to further cold working.

The blank 67 is then placed in the side wall extrusion die 72 (Fig. 6) having a cavity 73 therein provided with an extrusion shoulder 74, the die being relieved at 75 below the extrusion shoulder. A punch 76 having a nose member 77 and an extrusion shoulder 77a is associated with the die 72.

The location of the blank 67 when placed in die 72 is indicated by dot-dash lines in Fig. 6; and similarly the location of the punch 76 at the beginning of the forward extrusion operation is illustrated by dot-dash lines. As shown, the outer angular extrusion shoulder 68 of the blank 67, the formation of which was started at 38 (Figs. 3 and 12), rests on the extrusion shoulder 74 of the die 72. Similarly, the angled extrusion shoulder formed at the top end of the thickened portion 70 of the blank 67, the formation of which was started at 39 (Figs. 3 and 12), receives the angled extrusion shoulder 77a of the punch 76.

Downward movement of the punch 76 applies an extrusion pressure or force indicated by the arrow 78 through the extrusion shoulder 77a to the upper end of the side walls of the blank 67 and the metal in the thick side walls 70 is forced under compression downward and extruded through the escape area between the extrusion shoulder 74 and the punch nose member 77, as indicated by the arrows 79. This extrusion operation not only thins and elongates the side walls of the piece but work hardens the same to the desired degree of hardness dependent upon the restricted flow area between the punch and extrusion shoulder through which the metal is extruded. The final limit of downward movement of punch 76 and the extruded blank 80 resulting from the extruding operation are shown in full lines in Fig. 6. A flange 81 remains at the upper end of the extruded side walls 82, and the side walls 82 extend upwardly from the bottom wall portions 65 and 66 previously formed in the final bottom-forming operation of Fig. 5.

The metal in the blank 80 has been cold worked in the wall portions 65, 66 and 82, to the final desired degree of hardness while the metal in the flange portion 81, still remains relatively soft. In order to avoid damage to the punch 76, the extrusion die 72, the blank 67, or extruded article 80, no pressure is applied to the finally completed bottom wall 65 of the blank 67 at the beginning of the extrusion operation, a slight clearance between the end of the punch nose 77 and the bottom wall 65 of the blank 67 being indicated at 83 in Fig. 6.

The extruded article 80 could be further elongated by continued downward pressure applied by the punch 76 until the flange 81 becomes thinner than shown; but for the purpose of later operations, this flange 81 is retained thicker than the thickness of the extruded side walls 82.

The blank 80 is then placed in a lower primary nosing support die 84 (Fig. 7) and the upper nosing die 85 is moved downward in the direction of the arrow 86 to apply pressure, indicated by the arrows 87, to the outturned flange 81 of the blank 80 thereby reducing the diameter thereof and forming and nosing the same inward to a shape shown somewhat diagrammatically at 88 in Fig. 7, the metal at the upper open end thereof having been thickened by the reduction in diameter.

The article resulting from the primary nosing operation of Fig. 7 is then placed in a lower final nosing support die 89 (Fig. 8) having a cooperating upper nosing die 90 which when moved downward in the direction of the arrow 91 further necks the upper open end 88 of the the blank 80 inward to form the restricted neck 92 having relatively thick walls and a small central opening 93. The completed article thus made is indicated at 94 in Fig. 9 in the form of a pressure cylinder which may be used in fire extinguishers.

The working of the metal in the flange 81 by the nosing operations to form the neck 92 also develops the desired final hardness and strength in the neck 92. The pressure cylinder 94, as illustrated, comprises a cold-worked closed-end tubular steel article formed from ordinary steel having the desired carbon content and having a sound, strong, leakproof, dense, pressure-resisting bottom wall metal structure, the bottom wall being convex outside. The side walls 82 thereof are shown as being somewhat tapering in thickness and the bottom wall 65 is slightly thicker than certain portions of the side walls. However, these wall thicknesses may be formed in any desired manner and may be uniform depending upon the size and design of the various dies and punches used in the described operations.

The upper constricted neck wall is shown as being relatively thicker at 92, and this thicker wall results from leaving sufficient metal at 81 in the extrusion operation of Fig. 6 to form the thickened wall portion 92. If less metal is desired in the final article 94 at the restricted neck 92, the extrusion operation of Fig. 6 will be carried further to leave a thinner flange 81.

If the final article being made is to be shaped somewhat as illustrated in Fig. 7, as in the manufacture of ammunition shells, an operation similar to the operation of Fig. 7 may comprise the final forming operation.

If an outturned, rather than a necked-in, wall at the upper end of the finished article is desired, the necking-in operations may be replaced by flattening or forming operations to provide a thickened, outturned flange 97 (Fig. 15), or a thickened, displaced, outturned flange 98 (Fig. 16) or a reversely turned, thickened flange 99 as illustrated in Fig. 17.

An integral tubular article may be formed by the improved method having tubular walls of uniform or varying or different diameters and having an integral partition wall between the ends of the article, as shown in Figs. 18 to 21. The grain may be crossed in the partition wall which is the common bottom wall of both chambers formed in the article. Thus, when a closed-bottom tubular article is referred to herein, the bottom wall is not necessarily at the end of the article but may be a partition wall intermediate the ends thereof.

Figure 18:
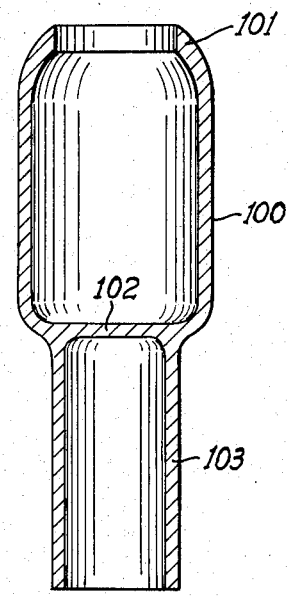
Figure 19:
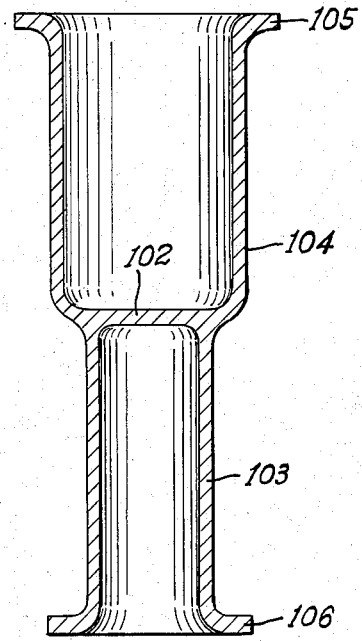
Figure 21:
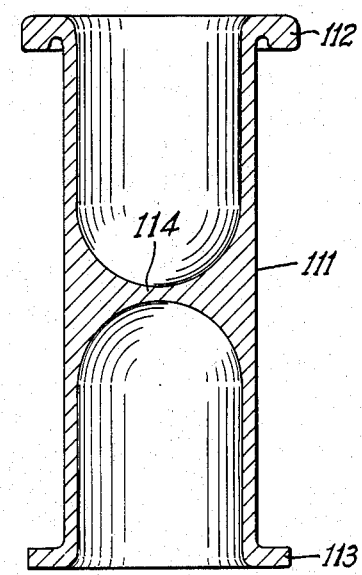

Fig. 18 illustrates an article 100 having a nosed-in top 101, a partition wall 102, and a reduced-diameter lower end 103. Fig. 19 shows a similar article 104 having outturned flanges 105 and 106 which may be shaped as shown in Figs. 15, 16 and 17.

Figure 20:
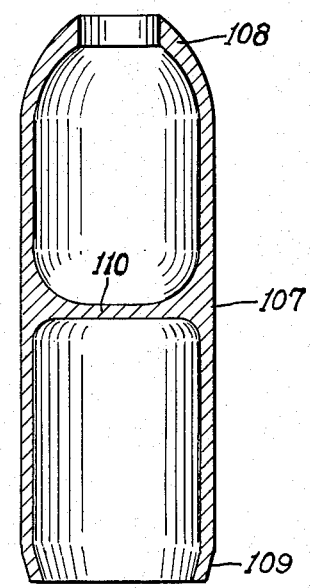

Fig. 20 shows an article 107 having uniform diameter side walls, nosed in at the top 108, and necked in at the bottom 109 with a partition wall 110. The article 111 of Fig. 21 has outturned flanges 112 and 113 at its ends and a curved contour partition wall 114.

In each of walls 102, 110 and 114, the grain is crossed to provide a strong, leakproof and pressure resistant wall, by subjecting the wall to axial pressure to deform the grain flow lines and form a flat wall, then laterally inwardly squeezing the deformed grain flow lines, and then axially compressing the wall to complete the crossing of the grain.

In connection with all of the cold working operations illustrated, normal press or die lubricants are used, and the starting blank for each operation is preferably bonderized or provided with a phosphate coating to assist in holding the lubricant on the surfaces of the blank and to reduce friction between the blanks and punches and dies.

The foregoing description sets forth in detail the various steps utilized for "crossing the grain at the bottom" of the finished article 94, and this grain-crossing procedure is utilized for sealing the grain structure in the bottom wall under compression to render the bottom wall 65 of the closed-bottom container 94 leakproof and capable of withstanding high pressures. It also enables the formation of a sound, curved or convex-shaped bottom wall. As shown, the bottom wall 65 is curved in the same manner both inside and outside but the same procedure may be used for forming a concave bottom wall, or one which is rounded outside and flat inside, or vice versa. The same procedure may also be used for forming a flat bottom wall having a crossed grain therein.

Briefly, the grain-crossing procedure involves working the blank under compression and applying successive or simultaneous angular compressive forces to the bottom wall thereof which work the metal first in one direction and then in another angular to and inward of the first direction.

Grain-crossing does not occur as a result of carrying out successive extrusion steps. For instance, if the grain is not required to be crossed in the bottom wall of the article being formed, the steps illustrated in Figs. 4 and 5 could be omitted and the blank resulting from the operation shown in Fig. 3 could be taken directly to the extrusion die of Fig. 6 and extruded with a flat bottom which would not necessarily be leakproof or resistant to high pressures.

Accordingly, the grain-crossing procedure is used for making a pressure container, or a leakproof container, or a closed-bottom container having a convex or a concave shape.

As indicated in the foregoing description and drawings, there is no scrap loss whatsoever from the starting blank 1 to the finished article 94, all of the metal in the blank 1 having been repeatedly cold worked to form the finished article.

In the actual use of the improvements, discoveries and procedures of the present invention, physical properties of the starting blank have increased as much as three to five or more times in the finished product made from ordinary steel ranging from ingot iron up to, say, .40 carbon steel; and an ultimate strength of at least 160,000 lbs. per square inch has been developed in a final product made from .30 carbon steel. Similarly, hardnesses in the final product have been developed as high as 105 Rockwell B Scale hardness in an article made from ingot iron.

The new discoveries and procedures for crossing the grain at the bottom have been described in connection with the manufacture of steel articles because of the particular problems present in the manufacture of such articles. When cold working non-ferrous metals many of the problems present in connection with cold working ferrous metals are not present. However, it is to be understood that the present improvements are also applicable to the cold working of non-ferrous metals. Furthermore, the various operations described may be carried out on any press of suitable size whether mechanically or hydraulically operated. The larger the working pressures involved, the larger must be the capacity of the press.

Accordingly, the present invention provides a radically new and different procedure for the manufacture of steel pressure cylinders and the like by cold working; substantially reduces the cost of making such articles; provides for the elimination of scrap losses in the manufacture of closed-bottom tubular steel articles; provides for forming a dense, sound, strong, leakproof and pressure-resisting bottom wall metal structure by cold working and without subsequent heat treatment in the manufacture of a closed-bottom tubular steel article; provides for the manufacture of a cylinder having an integral, convex, flat or concave bottom wall or base with the desired degree of strength or hardness developed in the article walls by cold working; and overcomes prior art difficulties and solves longstanding problems in the art.

In the foregoing description certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific article shown, or to the uses of the articles described.

Having now described the features, discoveries and principles of the invention, the operation and procedures of preferred method steps thereof, the characteristics of the new articles, and the advantageous, new and useful results obtained thereby; the new and useful products, methods, steps, operations, procedures, discoveries and principles, and mechanical equivalents obvious to those skilled in the art, are set forth in the appended claims.

Certain method steps relating generally to cold working metal blanks disclosed but not claimed herein are claimed in my copending continuation application Serial No. 161,760 filed May 13, 1950; and the cold-worked tubular steel article disclosed but not claimed herein is claimed in my copending divisional application Serial No. 193,349 filed November 1, 1950.

I claim:

1. In a method of cold working a solid steel blank to form a closed-bottom tubular article, the steps of laterally confining the blank and applying axial compression thereto to squeeze metal in the lower portion thereof laterally inward and to downwardly displace metal in the upper central portion thereof, then laterally confining the lower portion of the blank and applying further axial compression flatwise to the top of the blank to further displace the metal from the upper central portion thereof to the lower portion of the blank while flowing intervening metal around the downwardly displaced metal in the opposite direction to form a flat-bottomed cup, and then working the metal in the flat bottom wall of the cup by pushing the lower flat bottom end of the cup into a smaller-diameter cavity by pressure applied to the top of the cup side walls to squeeze its flat bottom wall laterally inward.

2. In a method of cold working a solid steel blank to form a closed-bottom tubular article, the steps of laterally confining the blank and applying axial compression thereto to squeeze metal in the lower portion thereof laterally inward and to downwardly displace metal in the upper central portion thereof, then laterally confining the lower portion of the blank and applying further axial compression flatwise to the top of the blank to further displace the metal from the upper central portion thereof to the lower portion of the blank while flowing intervening metal around the downwardly displaced metal in the opposite direction to form a flat-bottomed cup, then working the metal in the flat bottom wall of the cup by pushing the lower flat bottom end of the cup into a smaller-diameter cavity by pressure applied to the top of the cup side walls to squeeze its flat bottom wall laterally inward, and then axially compressing the laterally inwardly squeezed metal in the bottom of the cup.

3. In a method of cold working a solid steel blank to form a closed-bottom tubular article, the steps of laterally confining the blank and applying axial compression thereto to squeeze metal in the lower portion thereof laterally inward and to downwardly displace metal in the upper central portion thereof, then laterally confining the lower portion of the blank and applying further axial compression flatwise to the top of the blank to further displace the metal from the upper central portion thereof to the lower portion of the blank while flowing intervening metal around the downwardly displaced metal in the opposite direction to form a flat-bottomed cup, then working the metal in the flat bottom wall of the cup by pushing the lower flat bottom end of the cup into a smaller-diameter cavity by pressure applied to the top of the cup side walls to squeeze its flat bottom wall laterally inward, then axially compressing the laterally inwardly squeezed metal in the bottom of the cup; and then confining and holding the side walls of the cup and applying axial pressure to the top of the cup side walls to extrude the same downward thereby elongating the same and reducing the external diameter thereof.

4. The method of cold working a metal blank to closed-bottom, tubular shape to form a sound, strong, leakproof, dense, pressure-resisting bottom wall metal structure therein, including the steps of axially compressing a metal blank having substantial height to cup shape to provide a substantially flat bottom wall in the formed cup, then squeezing and compressing the flat bottom wall laterally inward at an angle to the vertical axis of the bottom wall by pushing the lower flat bottom end of the cup into a smaller diameter cavity by pressure applied at the top of the cup side walls without axially confining the cup bottom wall while the same is squeezed laterally inward to permit the same to thicken, and then axially compressing the inwardly-squeezed bottom wall metal to thin the same and to backwardly extrude metal from the bottom wall into the side walls of the resulting article.

5. The method of cold working a metal blank to closed-bottom tubular shape to form a sound, strong, leakproof, dense, pressure-resisting, bottom wall metal structure therein, including the steps of axially compressing a metal blank having substantial height to cup shape to provide a substantially flat bottom wall in the formed cup, annealing the formed cup, then squeezing and compressing the flat bottom wall laterally inward at an angle to the vertical axis of the bottom wall by pushing the lower flat bottom end of the cup into a smaller diameter cavity by pressure applied at the top of the cup side walls without axially confining the cup bottom wall while the same is squeezed laterally inward to permit the same to thicken, and then axially compressing the inwardly-squeezed bottom wall metal to thin the same and to backwardly extrude metal from the bottom wall into the side walls of the resulting article.

6. The method of making a closed-bottom tubular steel article from ordinary steel ranging from ingot iron to .40 carbon steel and developing an ultimate strength in the bottom and side walls of the finished article by cold working without heat treatment ranging from three to five times that present in the blank metal, which includes the steps of forming a center impression at the top and angularly reducing the bottom of a solid steel blank by subjecting the central top portion of the blank flatwise to axial pressure and the bottom of the blank to inward upward angular reactive pressure thereby working the blank by compressive forces acting at angles to each other, further flatwise compressing the centrally impressed metal downward while confining the lower portion of the blank against circumferential expansion to displace the metal below the central impression downward to form the bottom wall of a cup and meanwhile displacing and extruding other metal in the blank upward to form the side walls of said cup, laterally squeezing the metal in the cup bottom wall inward by pushing the bottom end of the cup into a smaller-diameter cavity by pressure applied to the top of the cup side walls without axially confining the cup bottom wall while the same is laterally squeezed to permit the bottom wall to thicken, then axially compressing, coining and thinning the cup bottom wall, and then downwardly extruding the cup side walls to elongate and thin the same by pressure applied to the top of said side walls.

7. The method of forming a cold-worked, closed bottom tubular article having a sound, curved bottom wall which includes the steps of successively flatwise axially compressing a metal blank to form a flat-bottomed cup, inwardly angularly compressing the cup bottom to start the formation of a curved bottom wall by pushing the lower end of the flat-bottomed cup into a restricted curved cavity by pressure applied at the top of the cup side walls without axially confining the cup bottom to permit the same to thicken and form to curved shape, and then axially compressing the bottom wall to complete the curved formation thereof.

8. The method of making a closed-bottom tubular steel article which includes the steps of applying an axial compressive force at the top center and an angled force at the bottom corner of a solid steel blank to form a central impression in the top surface and an angular corner at the bottom thereof; then confining the bottom portion of the thus-formed blank and axially flatwise compressing the metal below the center impression to move the same to the bottom portion of the blank and extrude other metal in the blank upwardly to cup shape; then applying a compressive force to the top of the cup side walls while laterally inwardly confining the bottom portion of the blank to provide a reaction force resulting from the top applied compressive force to thereby laterally inwardly squeeze, compress and reduce and to axially thicken the bottom wall, and then axially compressing, coining and thinning the bottom wall and backwardly extruding metal from the bottom wall into the side walls of the article as the bottom wall is being thinned.

9. The method of cold working a metal blank to closed-bottom tubular shape to form a crossed grain structure in the bottom wall thereof, the steps of cold forming a metal blank having a height substantially greater than the final bottom wall thickness of the finished article, having grain flow lines running generally in an axial direction, and having a diameter approximating that of the finished article to cup shape by central axial compression and surrounding backward extrusion to provide a substantially flat thin-walled bottom in the formed cup; the grain flow lines in the cup bottom wall being deformed by said axial compression to irregular or random arrangement; circumferentially inwardly squeezing the flat bottom wall by pushing the lower end of the cup into a restricted cavity by pressure applied at the top of the cup side walls to inwardly displace and compress the deformed grain structure in the bottom wall; and then applying axial compression to the inwardly-squeezed bottom wall to form the desired bottom wall configuration and to axially compress the inwardly-compressed deformed grain structure and cross and seal said grain structure in the bottom wall.

10. The method of cold working a metal blank to form a closed-bottom tubular article, including the steps of axially compressing the blank to reduce the axial thickness and increase the diameter thereof and to extrude metal therein upward and outward in directions opposite and angular to the direction of the compressive force to form a cup shape having a shouldered side wall with a larger diameter above the shoulder than and substantially the same diameter below the shoulder as the diameter of the blank and having a flat cavity bottom wall below the shoulder within the same diameter side wall portion, pushing the sides of the flat bottom wall into a smaller diameter cavity by pressure applied at the top of the larger diameter cup side wall portion without axially confining the bottom wall to thicken and laterally compress the same, and then axially compressing the laterally inwardly compressed bottom wall.

References Cited in the file of this patent

UNITED STATES PATENTS

| 416,077 | Robertson | Nov. 26, 1889 |
| 529,597 | Cayley et al. | Nov. 20, 1894 |
| 808,177 | Thiem | Dec. 26, 1905 |
| 1,189,958 | Jockmus | July 4, 1916 |
| 1,598,240 | Carlson | Aug. 31, 1926 |
| 1,702,278 | Simons | Feb. 19, 1929 |
| 1,841,920 | Smith | Jan. 19, 1932 |
| 1,864,475 | Rudd | June 21, 1932 |
| 1,929,802 | Brauchler | Oct. 10, 1933 |
| 1,948,437 | Bowers | Feb. 20, 1934 |
| 1,971,083 | Schlaa | Aug. 21, 1934 |
| 1,984,751 | McBride et al. | Dec. 18, 1934 |
| 2,016,227 | Clausen | Oct. 1, 1935 |
| 2,025,973 | Cornell | Dec. 31, 1935 |
| 2,026,133 | Mapes | Dec. 31, 1935 |
| 2,028,996 | Sautier | Jan. 28, 1936 |
| 2,079,769 | McAbee | May 11, 1937 |
| 2,088,525 | Leussler | July 27, 1937 |
| 2,140,775 | Talbot-Crosbie | Dec. 30, 1938 |
| 2,193,245 | Buxton | Mar. 12, 1940 |
| 2,251,094 | Witter | July 29, 1941 |

(Other references on following page)

UNITED STATES PATENTS

| | | |
|---|---|---|
| 2,349,970 | Lambeek | May 30, 1944 |
| 2,452,636 | Cunningham | Nov. 2, 1948 |

FOREIGN PATENTS

| | | |
|---|---|---|
| 432,718 | Great Britain | Aug. 1, 1935 |
| 438,183 | Great Britain | Nov. 12, 1935 |

OTHER REFERENCES

Summary Report on Cold Shaping of Steel, Research and Development Project No. SPOTB (1947) published by Dept. of Commerce.

Cold Shaping of Steel, July 1, 1947, Heintz Mfg. Co., Phila. 20, Pa., pgs. 34, 35, 41, 42, 69 and 72.

Iron Age, August 4, 1949, pages 90–105.